Patented Feb. 20, 1951

2,542,068

UNITED STATES PATENT OFFICE 2,542,068

SUCROSE POLYHYDRATE GLAZING OF FRUIT

Frank E. Young, Berkeley, and Francis T. Jones, El Cerrito, Calif., assignors to the United States of America as represented by the Secretary of Agriculture No Drawing. Application January 23, 1948, Serial No. 4,057

16 Claims. (Cl. 99—102)

(Granted under the act of March 3, 1883, as amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to the glazing of fruit. It particularly relates to a process involving coating fruit with a suspension of sucrose polyhydrate crystals in sucrose syrup and then freezing the coated fruit, and to the new products obtained, consisting of fruit covered with a hard, white, opaque coating. This coating consists essentially of sucrose polyhydrate crystals and ice. The novel glazed products can be kept almost indefinitely in cold storage and retain their freshness and flavor.

One of the advantages of this invention is that the individual pieces of glazed fruit do not cohere to form a solid mass when packaged but remain separate. The resulting package contains loose pieces of glazed fruit, so that the consumer can easily remove part of the contents. The novel products can be rapidly and uniformly thawed by simply opening the package and spilling the contents on a flat vessel. The particles being separate, each will rapidly thaw at the same rate as every other particle.

Another important advantage of this invention is that the glaze is hard and protects the fruit within it. This is important in the case of cherries and berries which when frozen by conventional methods are tender and easily crushed during storage and/or transportation. When fruit is glazed in accordance with this invention, the glaze protects the fruit and thus it is not injured in storage or transportation. Another advantage lies in the fact that our process results in a saving of sugar. It is customary to pack some fruits such as strawberries in sugar syrup. To this end sufficient syrup must be used to fill all the interstices of the package to prevent oxidation. In our process, each individual piece of fruit is separately glazed and the interstices between individual pieces need not be filled. The glaze not only protects the fruit from crushing but also prevents oxidation, browning, of the fruit during storage.

An object of this invention is to provide novel processes for glazing fruit.

Another object of this invention is to provide processes for encasing fruit in a hard envelope of sucrose polyhydrate and ice.

A further object of this invention is to provide a coating liquid for attaining the above objects.

A further object of this invention is to provide novel products namely, fruits encased in a hard envelope of sucrose polyhydrate crystals and ice.

An additional object of this invention is to provide novel packages containing disconnected units of glazed fruits.

Sucrose polyhydrate is a white crystalline material and is a mixture of hydrates of sucrose. The primary components of this mixture are hydrates of sucrose having two or more molecules of water per molecule of sucrose. These primary components are definite chemical compounds as can be ascertained by their crystal structure. One of the hydrates appears to be the dihydrate or the hemipentahydrate. The primary components form needle-like or elongated bladed orthorhombic crystals in spherulitic masses. This crystalline structure shows definitely that distinct chemical compounds are present. Sucrose itself forms approximately equidimensional, blocky monoclinic crystals while ice forms hexagonal stars and plates.

The polyhydrate is made by cooling a sucrose syrup having a concentration above 56%, preferably in the range from about 56% to about 70%, and seeding with a few crystals of the polyhydrate from a previous batch. With the seeds as nuclei, crystals of the polyhydrate grow and can be removed by straining or filtering. The temperature to which the syrup is cooled depends on the concentration of sucrose. In general, the temperature should be below 45° C. However, such elevated temperature is operative only when the concentration is high, about 90%, and if any crystals of anhydrous sucrose are present no polyhydrate will be formed. For this reason it is preferred to use a syrup of concentration from about 56% to 70% and cool to a temperature in the range from about minus 9° C. to about 0° C. The concentration of 56% is the eutectic composition and the crystals of polyhydrate formed will be accompanied by ice crystals. If the presence of ice crystals is undesired, the concentration should be kept above 56%. The lower limit of temperature, about minus 9° C. is not critical except to prevent accompanying formation of ice crystals. If the seeded syrup of about 56% to about 70% concentration is cooled to below about minus 9° C., polyhydrate crystals and ice crystals will both be formed. In our novel coating process the presence of ice crystals is not deleterious and no special effort need be made to avoid the presence thereof. In practicing our invention, it is not necessary to prepare the polyhydrate crystals by a separate operation as it is most convenient to prepare them right in the syrup to be used as the coating liquid. Occasionally, the polyhydrate crystals will form spontaneously without seeding upon cooling a sucrose syrup but this type of operation cannot be relied on.

The first step in the glazing process involves coating the fruit with a suspension of sucrose polyhydrate crystals in sucrose syrup. The suspension may be applied in any manner or by any apparatus commonly used for coating processes. For instance, the suspension may be sprayed onto the fruit or the fruit may be dipped into the suspension. The suspension may also be applied with brushes, manually or mechanically operated. For large scale operations the fruit can be carried on an endless screen conveyor past suitable devices such as sprays, fountains, brushes, etc., whereby the suspension is applied. In any case the entire surface of the fruit should be covered. After coating with the suspension, the fruit is preferably drained and then frozen. The draining may be accomplished on screens which are preferably vibrated. An expedient to prevent sticking involves sanding the coated pieces with crystals of sucrose polyhydrate or a mixture of crystals of sucrose polyhydrate and ice. This sanding operation may be accomplished by the techniques well known in the confectionary art and the crystals may be applied by fountains, brushes, or in a rumble.

The liquid used in the coating operation is a suspension of sucrose polyhydrate crystals in sucrose syrup. The sucrose syrup preferably should have a concentration from about 56% to about 70%. The amount of sucrose polyhydrate is not critical. It is only necessary that there be enough of these crystals present to serve as nuclei for growth of additional crystals during the freezing step. A suitable suspension is had when the syrup has a creamy appearance due to presence of many fine crystals of the polyhydrate.

A convenient method of making the suspension involves dissolving sufficient sucrose in water to get a solution in the range from about 56% to about 70%. This solution is then cooled to from about 0° C. to about minus 9° C. and a few crystals of sucrose polyhydrate are added. The mixture is stirred from time to time and allowed to remain at this temperature until a creamy suspension is formed by the growth of more sucrose polyhydrate crystals. When the suspension forms a creamy consistency it is ready for use. In coating large amounts of fruit it is not necessary to make new batches of suspension. Sugar syrup is merely added to the suspension at approximately the same rate as the suspension is being used. Of course, the sugar syrup added should be cooled to prevent melting of the polyhydrate crystals. In this way the polyhydrate crystals keep growing on the new syrup added and the suspension remains approximately constant in its properties. In order to prevent the polyhydrate crystals from transforming into anhydrous sucrose crystals and water, because of too high a temperature, and to prevent solidification by ice formation, because of too low a temperature, the coating suspension should be maintained in the range from about 0° C. to about minus 9° C. The fruit which is being coated should be kept at a temperature of below about 0° C. and preferably below minus 10° C. If desired, other ingredients can be incorporated into the suspension whereby these ingredients will also be present in the glaze. Thus harmless food colors can be added to the suspension to dye the glaze any desired shade. Small amounts of flavoring agents may be added to give the glaze a particular odor and/or taste. The suspension can be fortified with food elements such as water-soluble vitamins or vitamin precursors to give the final product a higher nutritive value. Further extensions of this principle will be obvious from our teaching.

After the fruit has been coated with the suspension and drained or sanded, the coated pieces are frozen by subjecting them to a temperature below minus 10° C. To prevent sticking the coated pieces are frozen while on a screen or flexible belt which is preferably vibrated. Another expedient to prevent sticking involves dropping the coated pieces through a blast of intensely cold air whereby the coating will solidify while the piece is in space. After freezing, the pieces are packaged and stored at a temperature below minus 10° C. If desired, the coated pieces may be packaged before freezing. In such case it is preferred to sand the coated fruit with crystals of sucrose polyhydrate or with a mixture of sucrose polyhydrate crystals and ice to prevent sticking. As low temperatures as desired may be used for freezing and for storage as long as they are below minus 10° C.

The glaze produced is a hard, white, opaque material which consists essentially of crystals of sucrose polyhydrate and ice. The low temperature of the freezing or storage causes any sucrose crystals originally present in the suspension to be converted into crystals of sucrose polyhydrate. If the coating suspension used contained 56% sucrose solution, the glaze will contain about 61% sucrose polyhydrate and about 39% ice. Starting with 70% sucrose solution, the glaze will contain about 77% sucrose polyhydrate and about 23% ice. The crystals of ice and polyhydrate are thoroughly intermeshed and thereby form a hard, durable glaze.

When the glazed pieces are taken out of cold storage and exposed to air above 0° C. the glaze melts forming a sucrose syrup, which, of course, can be eaten with the fruit. If desired, the coated fruit may be eaten when the glaze is substantially intact. In such case the fruit may serve as a dessert or frozen confection.

The following example illustrates the process of this invention applied to particular materials under particular conditions. It is understood that this example is furnished only by way of illustration and not limitation.

*Example*

A 60% solution of sucrose in water was cooled and some crystals of sucrose polyhydrate added. The suspension was stirred from time to time and maintained at about minus 5° C. until enough of the polyhydrate crystals had grown to form a creamy suspension.

Samples of fruit were cooled to about minus 23° C. These samples consisted of (a) sliced peaches, (b) halved nectarines with skins on, (c) apple slices, and (d) apple slices which had been vacuum impregnated with sucrose syrup according to the patent application of D. G. Guadagni, Serial No. 791,441, filed December 12, 1947, now abandoned, entitled "Treatment of Apples to Improve Texture." The samples of fruit were dipped in the suspension, drained, and then spread out on a screen in a freezing compartment at about minus 23° C. After 15 minutes, the individual pieces were turned over on the screen. The fruit was allowed to remain in the freezer overnight, then packaged and stored in the same room. The packages were later examined and found to contain the individual glazed pieces as separate entities so that the contents could be separated readily into portions merely by reaching into the package and picking out some of the glazed pieces. Each piece of fruit was encased in a hard white opaque coating of the polyhydrate and ice. Some of the pieces of coated fruit were eaten shortly after removal from frozen storage while the coating was substantially intact and found to be a pleasant-tasting dessert or frozen confection. Upon standing in the air, the glaze melted forming a sugar syrup. The thawed fruit was tasted and found to have good fresh flavor and texture.

This invention can be applied to the glazing of any fruit. Among other fruits one can use apples, peaches, apricots, nectarines, plums, strawberries, raspberries, blackberries, cherries, blueberries, pears, or melons. The fruit may be whole, peeled, seeded or sectioned as customary in conventional freezing practice. Further, the fruit may be subjected to customary techniques prior to coating as for instance blanching or chemical treatment to inactivate the enzymes and destroy bacteria normally present. In the case of some fruits such as apples, it may be desired to apply firming treatment to the fruit prior to coating. To this end the apple tissues may be vacuum impregnated with sugar syrup according to the patent application of D. G. Guadagni, referred to above. The fruit need not be in its natural state. For instance, fruit purees or other fruit compositions may be frozen into blocks and then glazed according to the process herein disclosed.

Having thus described our invention, we claim:

1. A process of glazing fruit which comprises coating a fruit with a suspension of sucrose polyhydrate crystals in sucrose syrup then freezing the coated fruit.

2. A process of preparing glazed apple slices which comprises coating apple slices with a suspension of sucrose polyhydrate crystals in sucrose syrup then freezing the coated apple slices.

3. A process of preparing glazed peach slices which comprises coating peach slices with a suspension of sucrose polyhydrate crystals in sucrose syrup then freezing the coated peach slices.

4. A process of glazing cherries which comprises coating cherries with a suspension of sucrose polyhydrate crystals in sucrose syrup then freezing the coated cherries.

5. A process of glazing fruit which comprises coating fruit at a temperature below about 0° C. with a creamy suspension of sucrose polyhydrate crystals in sucrose syrup then freezing the coated fruit.

6. A process of glazing fruit which comprises coating fruit with a creamy suspension of sucrose polyhydrate crystals in sucrose syrup then freezing the coated fruit at a temperature below minus 10° C.

7. A process of glazing fruit which comprises coating fruit at a temperature below about 0° C. with a creamy suspension of sucrose polyhydrate crystals in sucrose syrup then freezing the coated fruit at a temperature below 10° C.

8. A process of glazing fruit which comprises coating fruit at a temperature below about 0° C. with a creamy suspension of sucrose polyhydrate crystals in sucrose syrup, said suspension having a total sucrose concentration from about 56% to about 70%, then freezing the coated fruit at a temperature below minus 10° C.

9. A process according to claim 8 wherein the fruit is sliced apples.

10. A process according to claim 8 wherein the fruit is sliced peaches.

11. A process according to claim 8 wherein the fruit is pitted cherries.

12. A process which comprises coating fruit at a temperature below about 0° C. with a creamy suspension of sucrose polyhydrate crystals in sucrose syrup, freezing the coated fruit at a temperature below minus 10° C., then packaging the glazed fruit and storing at below minus 10° C.

13. A composition of matter useful for glazing fruit comprising essentially a suspension of sucrose polyhydrate crystals in sucrose syrup.

14. A composition of matter useful for glazing fruit comprising essentially a creamy suspension of sucrose polyhydrate crystals in sucrose syrup, the total concentration of sucrose in said suspension being from about 56% to about 70%.

15. A process comprising cooling an aqueous sucrose syrup having a concentration of about 56% to 70% sucrose to a temperature below about 0° C., seeding with sucrose polyhydrate crystals, crystals of anhydrous sucrose being absent, maintaining the cooling to permit growth of the sucrose polyhydrate crystals, to form a creamy suspension of the polyhydrate crystals, chilling fruit to below about 0° C., coating the fruit with the creamy suspension, draining the syrup from the fruit, and packaging and storing at below minus 10° C.

16. A process of glazing fruit which comprises chilling the fruit to below 0° C., coating the chilled fruit with a suspension of sucrose polyhydrate crystals in sucrose syrup, the suspension being maintained at about 0° C. to minus 9° C., and draining the syrup from the fruit.

FRANK E. YOUNG.
FRANCIS T. JONES.

REFERENCES CITED

The following references are of record in the file of this patent:

UNITED STATES PATENTS

| Number | Name | Date |
| --- | --- | --- |
| 2,286,225 | Noyes | June 16, 1942 |
| 2,385,140 | Knowles | Sept. 18, 1945 |
| 2,418,745 | Bartlett | Apr. 8, 1947 |

OTHER REFERENCES

"Preservation of Quickly Perishable Fruits and Vegetables," by Prof. E. L. Overhoker, pages 25–26 of the July 1925 "Refrigerating World."